United States Patent
Kawase

(10) Patent No.: US 12,046,075 B2
(45) Date of Patent: Jul. 23, 2024

(54) INFORMATION PROCESSING APPARATUS, INFORMATION PROCESSING METHOD, AND PROGRAM

(71) Applicant: NEC Corporation, Tokyo (JP)

(72) Inventor: Nobuaki Kawase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 247 days.

(21) Appl. No.: 17/298,064

(22) PCT Filed: Dec. 7, 2018

(86) PCT No.: PCT/JP2018/045176
§ 371 (c)(1),
(2) Date: May 28, 2021

(87) PCT Pub. No.: WO2020/115910
PCT Pub. Date: Jun. 11, 2020

(65) Prior Publication Data
US 2022/0122377 A1    Apr. 21, 2022

(51) Int. Cl.
*G06V 40/16*    (2022.01)
*G06V 10/75*    (2022.01)

(52) U.S. Cl.
CPC ............ *G06V 40/172* (2022.01); *G06V 10/75* (2022.01); *G06V 40/168* (2022.01)

(58) Field of Classification Search
CPC ...... G06F 18/22; G06V 10/75; G06V 40/168; G06V 40/172
See application file for complete search history.

(56) References Cited

U.S. PATENT DOCUMENTS

2006/0120564 A1    6/2006    Imagawa et al.
2015/0339516 A1*   11/2015   Yano .................... G06T 7/74
                                                        382/118
(Continued)

FOREIGN PATENT DOCUMENTS

JP    2002279540 A    9/2002
JP    2005086626 A    3/2005
(Continued)

OTHER PUBLICATIONS

Japanese Office Action for JP Application No. 2022-014709, mailed on Feb. 28, 2023 with English Translation.
(Continued)

*Primary Examiner* — Ruiping Li

(57) ABSTRACT

An information processing apparatus (100) includes an extraction unit (102) that extracts first face feature information from a facial region of a person included in a first image (10), and extracts first person region feature information from a region including others than a face of the person, and a collation unit that collates two or more pieces of feature information with each other, in which the extraction unit (102) extracts, in a case where second face feature information is unable to be extracted from a facial region of a person included in the second image (20), second person region feature information from a region including others than a face of the person included in the second image (20), and in which the collation unit (104) collates the second person region feature information with the first person region feature information.

18 Claims, 16 Drawing Sheets

(56) References Cited

U.S. PATENT DOCUMENTS

2017/0351906 A1  12/2017  Oguchi et al.
2018/0276487 A1* 9/2018  Syu .................. G06V 40/50

FOREIGN PATENT DOCUMENTS

| | | |
|---|---|---|
| JP | 2006293912 A | 10/2006 |
| JP | 2006301995 A | 11/2006 |
| JP | 2009199322 A | 9/2009 |
| JP | 2010-086323 A | 4/2010 |
| JP | 2010257451 A | 11/2010 |
| JP | 2013-153304 A | 8/2013 |
| JP | 2013196423 A | 9/2013 |
| JP | 2014149620 A | 8/2014 |
| JP | 2015-002553 A | 1/2015 |
| JP | 2016-045742 A | 4/2016 |
| JP | 2018-112890 A | 7/2018 |
| JP | 2019-009529 A | 1/2019 |
| WO | 2006013765 A1 | 2/2006 |
| WO | 2017/146160 A1 | 8/2017 |
| WO | 2018/151062 A1 | 8/2018 |
| WO | 2018/198373 A1 | 11/2018 |

OTHER PUBLICATIONS

Yuki Watanabe et al., "Person Retrieval System for Surveillance Video Analysis using Multi-Perspective Features", IEICE Technical Report PRMU2013-172(Mar. 2014), The Institute of Electronics, Information and Communicaiton Engineers.

Indian Office Action for IN Application No. 202117025185 mailed on Mar. 16, 2022.

Extended European Search Report for EP Application No. 18942553.1 dated on Nov. 23, 2021.

Meltem Demirkus et al., "Automated person categorization for video surveillance using soft biometrics", Proceedings of SPIE, vol. 7667, 76670P-1-76670P-12, XP055042027, Apr. 5, 2010.

International Search Report of PCT Application No. PCT/JP2018/045176 mailed Mar. 12, 2019.

JP Office Action for JP Application No. 2022-014709, mailed on May 16, 2023 with English Translation.

* cited by examiner

INFORMATION PROCESSING APPARATUS, INFORMATION PROCESSING METHOD, AND PROGRAM

This application is a National Stage Entry of PCT/JP2018/045176 filed on Dec. 7, 2018, the contents of all of which are incorporated herein by reference, in their entirety.

TECHNICAL FIELD

This disclosure relates to an information processing system, an information processing apparatus, an information processing method, and a program, and particularly to an information processing system, an information processing apparatus, an information processing method, and a program, capable of performing an image recognition process.

BACKGROUND ART

In recent years, a technique of detecting a person matching a desired condition by using an image has been developed. For example, Patent Document 1 discloses a technique in which person feature information is acquired for each image included in a video, a person corresponding to a preset condition is received from the accumulated information, and information corresponding to a retrieval result is extracted. A technique is also disclosed in which a state of a person is judged, and the state of the person is used to identify the person by using various feature values.

Patent Document 2 discloses a system which sorts out all persons matching a retrieval condition from a video group captured by a plurality of cameras. Patent Document 3 discloses a technique of detecting a walking state of a person from temporally-distant frames or person image sequences by different cameras, and judging whether or not persons included in different image sequences are the same person on the basis of the walking state. Patent Document discloses a technique in which, even in a case where there are a plurality of face images of a plurality of persons in a video, specific information of a matching face image is acquired through matching with a database with respect to each face image, and the specific information is displayed around a person in the video.

RELATED DOCUMENT

Patent Document

[Patent Document 1] Japanese Patent Application Publication No. 2010-257451
[Patent Document 2] Japanese Patent Application Publication No. 2006-301995
[Patent Document 3] International Publication No. WO2006/013765
[Patent Document 4] Japanese Patent Application Publication No. 2006-293912

SUMMARY OF THE INVENTION

Technical Problem

The present inventor has examined a new technique for continuously tracking a specific person with a plurality of cameras by using image processing. In other words, an object of this disclosure is to provide a new technique for continuously tracking a specific person with a plurality of cameras by using image processing.

Solution to Problem

In each aspect of this disclosure, the following configuration is employed to solve the above-described problem.

A first aspect relates to an information processing apparatus.

An information processing apparatus related to the first aspect includes an extraction unit that extracts first face feature information from a facial region of a person included in a first image, and extracts first person region feature information from a region including others than a face of the person; and a collation unit that collates two or more pieces of feature information with each other, in which, in a case where second face feature information is unable to be extracted from a facial region of A person included in A second image, the extraction unit extracts second person region feature information from a region including others than a face of the person included in the second image, and in which the collation unit collates the second person region feature information with the first person region feature information.

A second aspect relates to an information processing method executed by at least one computer.

A first information processing method related to the second aspect is executed by an information processing apparatus, the method including extracting first face feature information from a facial region of a person included in a first image, and extracting first person region feature information from a region including others than a face of the person, collating two or more pieces of feature information with each other, extracting, in a case where second face feature information is unable to be extracted from a facial region of a person included in a second image, second person region feature information from a region including others than a face of the person included in the second image, and collating the second person region feature information with the first person region feature information.

It should be noted that other aspects of this disclosure may relate to a program causing at least one computer to execute the method of the second aspect described above, and may relate to a computer readable storage medium storing such a program. The storage medium includes a non-transitory medium.

The computer program includes computer program codes causing a computer to execute the information processing method on the information processing apparatus when the program is executed by the computer.

It should be noted that any combination of the above-described constituent elements, and expressional conversion of this disclosure among a method, an apparatus, a system, a storage medium, a computer program, and the like are also effective as an aspect of this disclosure.

Various constituent elements of this disclosure are not necessarily required to be individually independent elements. For example, a plurality of constituent elements may be configured as a single member, a single constituent element may be configured with a plurality of members, any constituent element may be a part of another constituent element, and a part of any constituent element may overlap a part of another constituent element.

A plurality of procedures are sequentially described in the method and the computer program of this disclosure, but the order of description does not limit an order of executing the plurality of procedures. Thus, in a case where the method and the computer program of this disclosure are executed, the order of the plurality of procedures may be changed within the scope without contradiction to contents thereof.

The plurality of procedures of the method and the computer program of this disclosure are not limited to being individually executed at different timings. Thus, another procedure may occur during execution of any procedure, and an execution timing of any procedure may partially or entirely overlap an execution timing of another procedure.

Advantageous Effects of Invention

According to the respective aspects, it is possible to provide a new technique for continuously tracking a specific person with a plurality of cameras by using image processing.

BRIEF DESCRIPTION OF THE DRAWINGS

The above-described object, and other objects, features, and advantages will become apparent throughout preferable example embodiments described below and the accompanying drawings.

DESCRIPTION OF EMBODIMENTS

Figure 1:
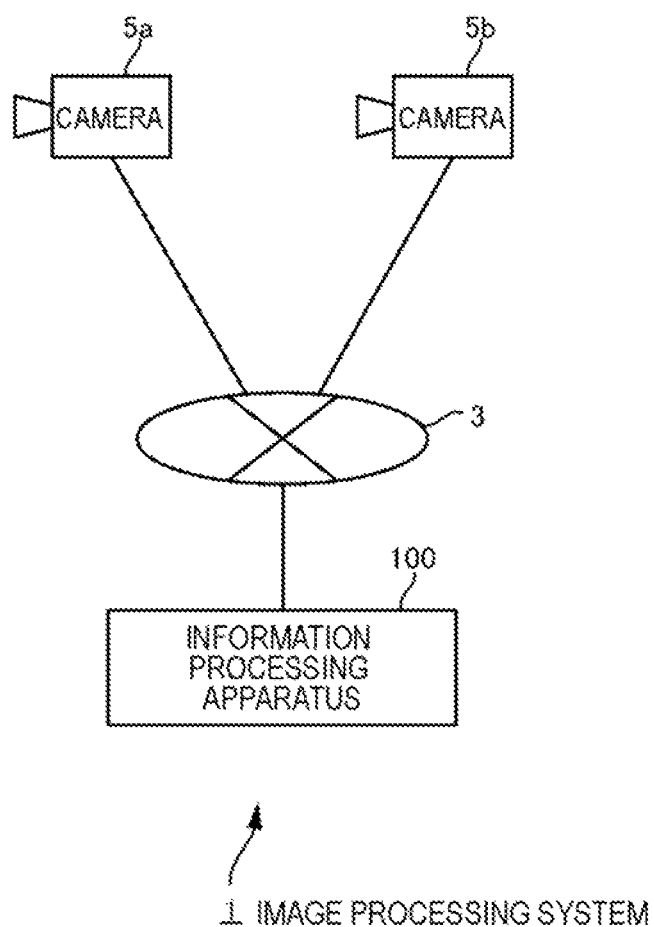
FIG. 1 is a conceptual diagram illustrating a configuration of an image processing system according to an example embodiment of this disclosure.

Hereinafter, example embodiments of this disclosure will be described with reference to the drawings. The same constituent elements are given the same reference numerals throughout all the drawings, and description thereof will not be repeated as appropriate.

In each drawing of the present specification, a configuration of a portion having no relation to the essence of this disclosure is omitted and is not illustrated.

First Example Embodiment

FIG. 1 is a conceptual diagram illustrating a configuration of an image processing system according to an example embodiment of this disclosure. An image processing system 1 includes an information processing apparatus 100. The information processing apparatus 100 is connected to a plurality of cameras 5a, 5b, . . . (referred to as a camera 5 or cameras 5 in a case where the cameras are not particularly required to be differentiated from each other) through a communication network 3. As will be described later in detail, the information processing apparatus 100 can continuously track a person even in a situation in which a face of the person who is a tracking target (hereinafter, referred to as a tracking target person) is not captured in an image.

The camera 5 is a camera including a lens and an imaging element such as a charge coupled device (CCD) image sensor, and is a network camera such as an Internet Protocol (IP) camera. The network camera has, for example, a wireless local area network (LAN) communication function, and is connected to the information processing apparatus 100 through a communication network, that is, a relay apparatus (not illustrated) such as a router. The cameras 5 may be so-called surveillance cameras provided in a street or inside and outside a building. The camera 5 may include a mechanism which tracks movement of a specific person in accordance with the movement, and performs control of a camera main body or a direction of a lens, zoom control, or focusing.

The camera 5 and the information processing apparatus 100 may be directly connected to each other, and may be indirectly connected to each other through the communication network 3 or the like as described above. For example, image data captured by the camera 5 may be directly transmitted to the information processing apparatus 100, and the information processing apparatus 100 may sequentially receive the image data. A storage device (not illustrated) which can be accessed by both of the camera 5 and the information processing apparatus 100 may be provided. In this case, image data captured by the camera 5 is stored in the storage device. The information processing apparatus 100 reads the image data from the storage device.

Here, the image data may be at least one of a still image and a moving image. A data format, a file format, a file size, an image size, a resolution of an image, a frame rate of moving images, and the like are not particularly limited, and data of various formats may be employed according to specifications, standards, performance, and the like of the camera 5 and the information processing apparatus 100, or image analysis processing performance or accuracy thereof. At least one frame of the image data is at least one of a first image and a second image which will be described later.

In the example embodiment, the "acquisition" includes at least one of an apparatus fetching (active acquisition) data or information stored in another apparatus or a storage medium and the apparatus receiving (passive acquisition) data or information which is output from another apparatus. As an example of the active acquisition, there are a case where an apparatus sends a request or an inquiry to another apparatus, and receives a response thereto, and a case where the apparatus accesses another apparatus or a storage medium, and reads data or information. As an example of the passive acquisition, there is a case where an apparatus receives delivered information (alternatively, transmitted information or information sent through push notification). The "acquisition" may include selectively acquiring data or information from received data or information, or selectively receiving delivered data or information.

Regarding a timing at which an image is transmitted from the camera 5 to the information processing apparatus 100, an image may be delivered in real time, for example, through streaming delivery, and images corresponding to a predetermined period may be transmitted at a predetermined interval. The transmission timing may be selected as appropriate on the basis of a memory capacity, a communication capacity, or image processing performance of the camera 5 or the information processing apparatus 100, or a communication situation or the like between the camera 5 and the information processing apparatus 100, and may be changed depending on a situation change.

Figure 2:
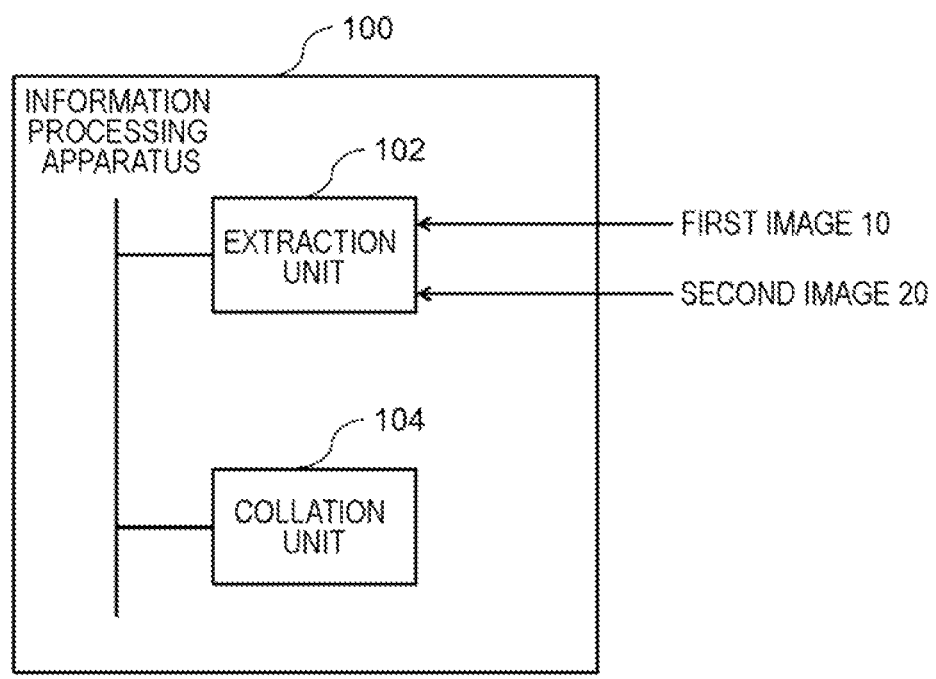
FIG. 2 is a functional block diagram illustrating a logical configuration of an information processing apparatus according to the present example embodiment.

FIG. 2 is a functional block diagram illustrating a logical configuration of the information processing apparatus 100 of the present example embodiment. The information processing apparatus 100 includes an extraction unit 102 and a collation unit 104.

The extraction unit 102 extracts first face feature information from a facial region of a person included in a first image 10, and extracts a first person region feature information from a region including others than the face of the person. The collation unit 104 collates two or more pieces of feature information with each other. In a case where a second face feature information cannot be extracted from a facial region of a person included in a second image 20, the extraction unit 102 extracts second person region feature information from a region including others than the face of the person included in the second image 20. The collation unit 104 collates the second person region feature information with the first person region feature information.

Specifically, the first image 10 is a reference image in which a tracking target person is captured. The second image 20 is an image from which the tracking target person is retrieved. The first image 10 and the second image 20 are captured at different timings. The first image 10 and the second image 20 may be captured by the identical camera 5, and may be captured by the different cameras 5.

The extraction unit 102 acquires the first image 10 by receiving the first image 10 from the camera 5 or reading the first image 10 from other storage media (not illustrated). The extraction unit 102 first specifies a facial region from the acquired first image 10 with at least one person as a tracking target person, and extracts at least one piece of first face feature information. The tracking target person may be at least one predetermined person included in the first image 10 or all persons included in the first image 10, and may be at least one specific person registered in a face feature information database as in an example embodiment which will be described later. As the tracking target person, at least one person may be selected by an operator among persons included in the first image 10 or persons registered in the face feature information database. Such a setting may be predefined, and may be changed by receiving specification from the operator.

As described above, the extraction unit 102 specifies a person region connected to a first facial region in the first image 10. The person region is a region indicating a person's body and belongings. The extraction unit 102 extracts the first person region feature information from the person region.

The extracted first person region feature information may be stored in a storage device (not illustrated).

The first person region feature information is information generated on the basis of a person region connected to a facial region of a tracking target person extracted by the extraction unit 102, and is feature information indicating an appearance feature such as a size or a costume of the person.

The first person region feature information includes information indicating features such as a height, a shoulder width, a body part ratio, a garment (a shape, a color, a material, or the like), a hair style (also including a hair color), an ornament (a cap, spectacles, an accessory, or the like), and a belonging (a bag, an umbrella, or a stick). The person region feature information may include information such as likelihood of the feature information.

In a case where the second face feature information cannot be extracted from a facial region of a person included in the second image 20, the extraction unit 102 extracts the second person region feature information from a region including others than the face of the person included in the second image 20. The collation unit 104 collates the extracted first person region feature information and second person region feature information with each other. A person region in the second image 20 from which the second person region feature information matching the first person region feature information is extracted is a person region of a tracking target person. Consequently, even though a face of a tracking target person is not captured in the second image 20, the person can be continuously tracked.

Here, the case where the second face feature information cannot be extracted includes a case where the degree of matching with the first face feature information is less than a threshold value. A case where at least a part of a face of a tracking target person is shielded in the second image 20, or the face is turned to the side, and thus a feature value suitable for collation cannot be extracted, is also included.

Is should be noted that the information processing apparatus 100 may display face image data of the person on a display such that the operator views the face of the tracking target person.

Figure 3:
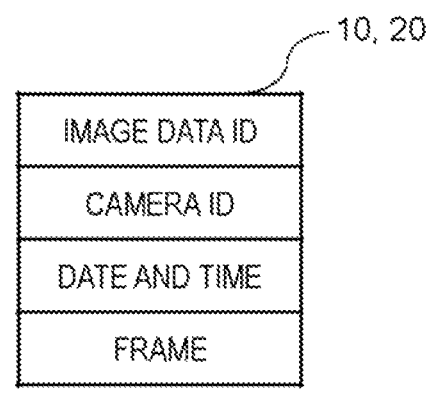
FIG. 3 is a diagram illustrating an example of a data structure of a first image and a second image.

FIG. 3 is a diagram illustrating an example of a data structure of the first image 10 and the second image 20. Each of the first image 10 and the second image 20 includes an image ID for identifying the image, a camera ID for identifying the camera 5 having captured the image, information indicating the capturing date and time (or which may be preservation date and time or update date and time) of the image, and the entity of image data. The image ID may be a file name. In a case where the image is a frame, the first image 10 and the second image 20 may include information indicating a frame number for determining the frame.

In the present example embodiment, the second image 20 is an image captured later than the first image 10, and images received from the respective cameras 5 in real time may be used. However, in other example embodiments, the second image 20 may be data which is captured and recorded earlier than the first image 10, that is, data stored in a nonvolatile storage unit. As will be described later, in the present example embodiment, even though a face of a person is not captured, the person is tracked by using a feature such as clothes. Therefore, if the person changes clothes, the person cannot be tracked. Thus, the second image 20 is an image captured in a period in which the person is supposed not to change clothes from a capturing time point of the first image 10, or in a period in which the person wears the same clothes as those in the first image 10.

Hereinafter, a description will be made of an operation of the information processing apparatus 100 configured as mentioned above.

Figure 4:
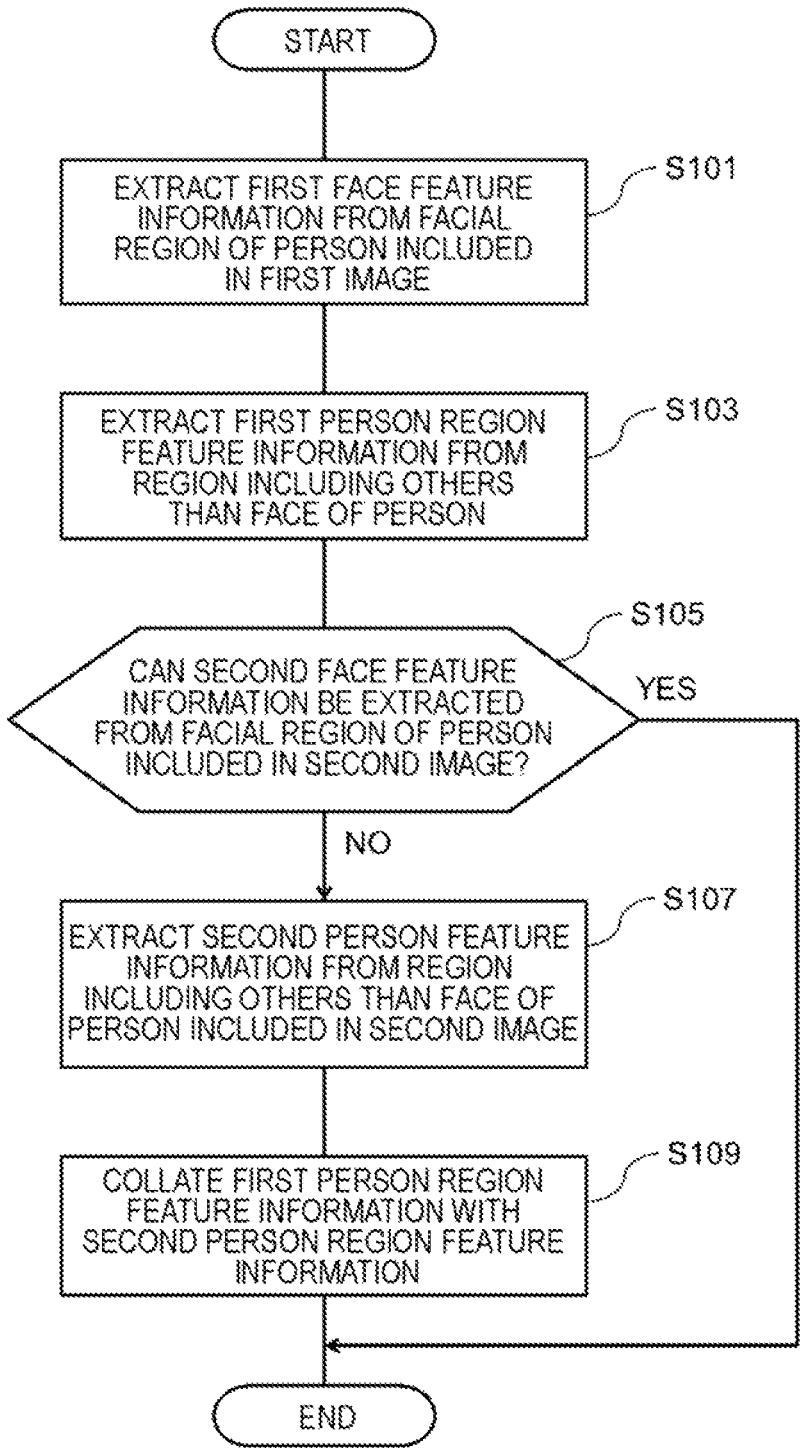
FIG. 4 is a flowchart illustrating an example of an operation of the information processing apparatus.

FIG. 4 is a flowchart illustrating an example of an operation of the information processing apparatus 100.

First, the extraction unit 102 acquires the first image 10, regards at least one person included in the first image 10 as a tracking target person, and extracts at least one piece of first face feature information from a facial region thereof (step S101).

The extraction unit 102 extracts first person region feature information from a region including others than the face of the person in the first image 10 (step S103). The extraction unit 102 specifies, for example, a person region from a portion located under a first facial region in a region connected to the first facial region. The extraction unit 102 may cause a portion located over the first facial region in the region connected to the first facial region to be included in the person region.

Next, the extraction unit 102 acquires the second image 20 from the camera 5, and judges whether or not second face feature information can be extracted from a facial region of a person included in the second image 20 (step S105). In a case where the second face feature information cannot be extracted (NO in step S105), the extraction unit 102 extracts second person region feature information from a region including others than the face of the person included in the second image 20 (step S107).

Next, the collation unit 104 collates the second person region feature information extracted in step S107 with the first person region feature information extracted in step S103 (step S109). In a case where the second person region feature information matches the first person region feature information, the person region from which the second person region feature information is extracted in the second image 20 is a tracking target person. In a case where the second face feature information is extracted in step S105 (YES in step S105), the process is finished without performing the processes (step S107 and step S109) of extracting the second person region feature information from the second image and performing collation. In other words, a facial region from which the second face feature information is extracted in the second image 20 is a tracking target person on the basis of a collation result of the face feature information.

As described above, in the present example embodiment, the extraction unit 102 extracts the first face feature information and the first person region feature information of a tracking target person from the first image 10. Even in a case where the second face feature information is not extracted from the second image 20, and tracking using the face feature information cannot be performed, a tracking target person can be tracked by using the second image 20 by collating the second person region feature information extracted from the second image 20 with the first person region feature information.

As mentioned above, according to the present example embodiment, even though a face of a tracking target person is not captured in the second image 20 received from the camera 5, the person can be continuously tracked.

Second Example Embodiment

Figure 5:
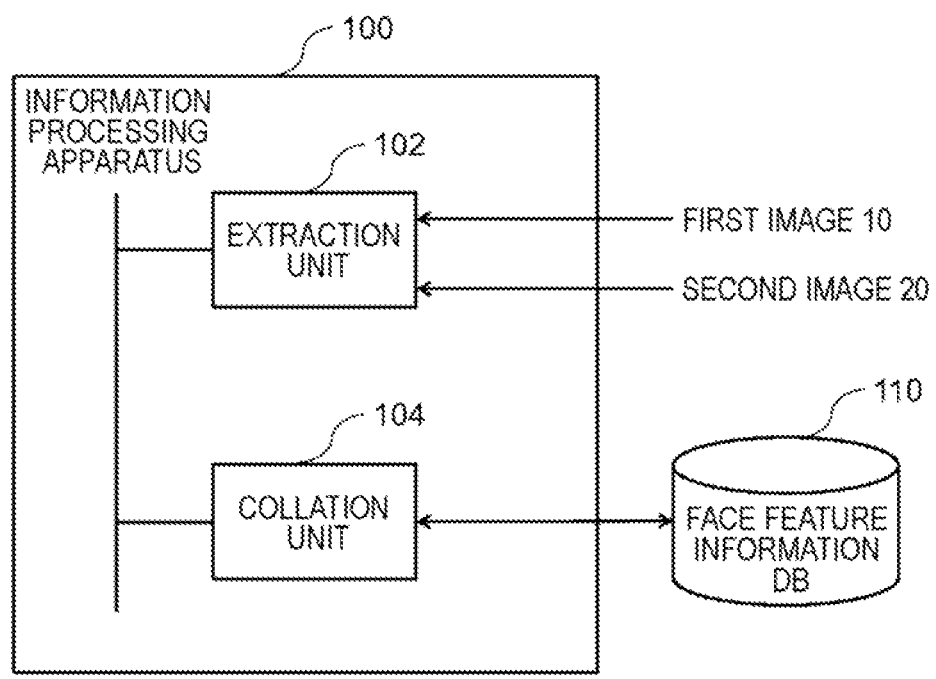
FIG. 5 is a functional block diagram illustrating a logical configuration of the information processing apparatus according to the present example embodiment.

FIG. 5 is a functional block diagram illustrating a logical configuration of the information processing apparatus 100 of the present example embodiment. The information processing apparatus 100 of the present example embodiment is the same as that in the first example embodiment except that face feature information of a tracking target person is registered in advance on a blacklist or the like.

The information processing apparatus 100 further includes a face feature information database 110 (illustrated as a "face feature information DB" in FIG. 5). The face feature information database 110 may be included in a plurality of apparatuses. The face feature information database 110 may be provided integrally with a main body of the information processing apparatus 100, and may be provided separately therefrom. The face feature information database 110 has a database structure, but may have other data structures.

In the present example embodiment, face feature information of a tracking target person is registered in the face feature information database 110.

The collation unit 104 collates face feature information extracted from a facial region of a person included in the first image 10 with first face information stored in the face feature information database 110. In a case where a collation result indicates a match, first person region feature information is extracted from the person included in the first image 10.

Figure 6:
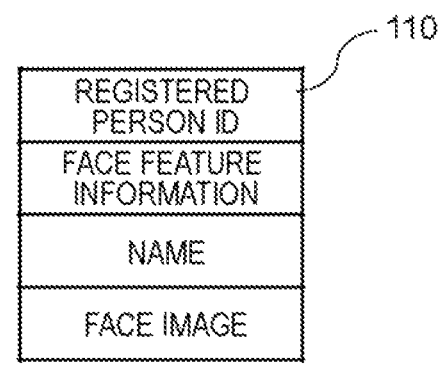
FIG. 6 is a diagram illustrating an example of a data structure of a face feature information database.

FIG. 6 is a diagram illustrating an example of a data structure of the face feature information database 110. The first face information which is face feature information of at least one person who is a tracking target is registered in the face feature information database 110. In the face feature information database 110, a registered person ID for identifying a registered person, face feature information (corresponding to first face information) of the person, the name, and face image data are associated with each other. It should be noted that the face feature information may not necessarily be stored in the face feature information database 110. In this case, the information processing apparatus 100 extracts the face feature information from the face image data when a collation process is performed.

A file format of the face image data is not particularly limited, but may be, for example, Joint Photographic Experts Group (JPEG), Bit MaP (BMP), Portable Network Graphics (PNG), or Tagged Image File Format (TIFF). In the face feature information database 110, the entity of image data may be registered, and a path indicating a location where image data is preserved and a file name may be registered.

Referring to FIG. 5 again, the extraction unit 102 specifies a facial region from the first image 10, and performs a collation process (hereinafter, referred to as a face authentication process in some cases) with the first face information registered in the face feature information database 110. A collation process target person may be all of a plurality of persons registered in the face feature information database 110, and may be at least one person selected by an operator. Such a setting may be predefined, and may be changed by receiving specification from the operator.

In the information processing apparatus 100 of the present example embodiment, step S111 (not illustrated) is included instead of step S101 in the flowchart of FIG. 4. In step S111, first, the extraction unit 102 acquires the first image 10, and extracts face feature information from a facial region of a person included in the first image 10. The collation unit 104 collates the extracted face feature information with the first face information stored in the face feature information database 110. The extraction unit 102 regards face feature information matching the first face information stored in the face feature information database 110, as first face feature information.

The extraction unit 102 extracts first person region feature information from a region including others than the face of the person in the first image 10 (step S103), and, in a case where face feature information cannot be extracted from the second image 20 (NO in step S105), extracts second person region feature information from the second image 20 (step S107). Next, the collation unit 104 collates the second person region feature information extracted in step S107 with the first person region feature information extracted in step S103 (step S109).

As described above, in the present example embodiment, the extraction unit 102 extracts, from the first image 10, the first face feature information matching the first face information registered in the face feature information database 110, and the first person region feature information of the person of the facial region. In the same manner as in the above-described example embodiment, even in a case where the second face feature information matching the first face feature information of a tracking target person is not extracted from the second image 20, and tracking cannot be performed by using face feature information, a tracking target person can be tracked by using the second image 20 by collating the second person region feature information extracted from the second image 20 with the first person region feature information.

In other words, in the present example embodiment, it is possible to achieve the same effect as that in the above-described example embodiment, and also to track a person registered in advance in the face feature information database 110 as a tracking target person.

Third Example Embodiment

The transmitter 100 of a third example embodiment is the same as that in the first example embodiment except that a face authentication process is also performed on the second image 20, and a collation process with first person region feature information is performed on a person region connected to a facial region of which a face is not authenticated. The third example embodiment is different from the first example embodiment in terms of an operation, but a configuration of the information processing apparatus 100 is the same as the configuration of the information processing apparatus 100 illustrated in FIG. 2, and will thus be described with reference to the functional block diagram of FIG. 2. It should be noted that the information processing apparatus 100 of the present example embodiment may have the same configuration as that of the information processing apparatus 100 of the other example embodiments, and the configurations may be combined with each other within the scope without contradiction.

Figure 7:
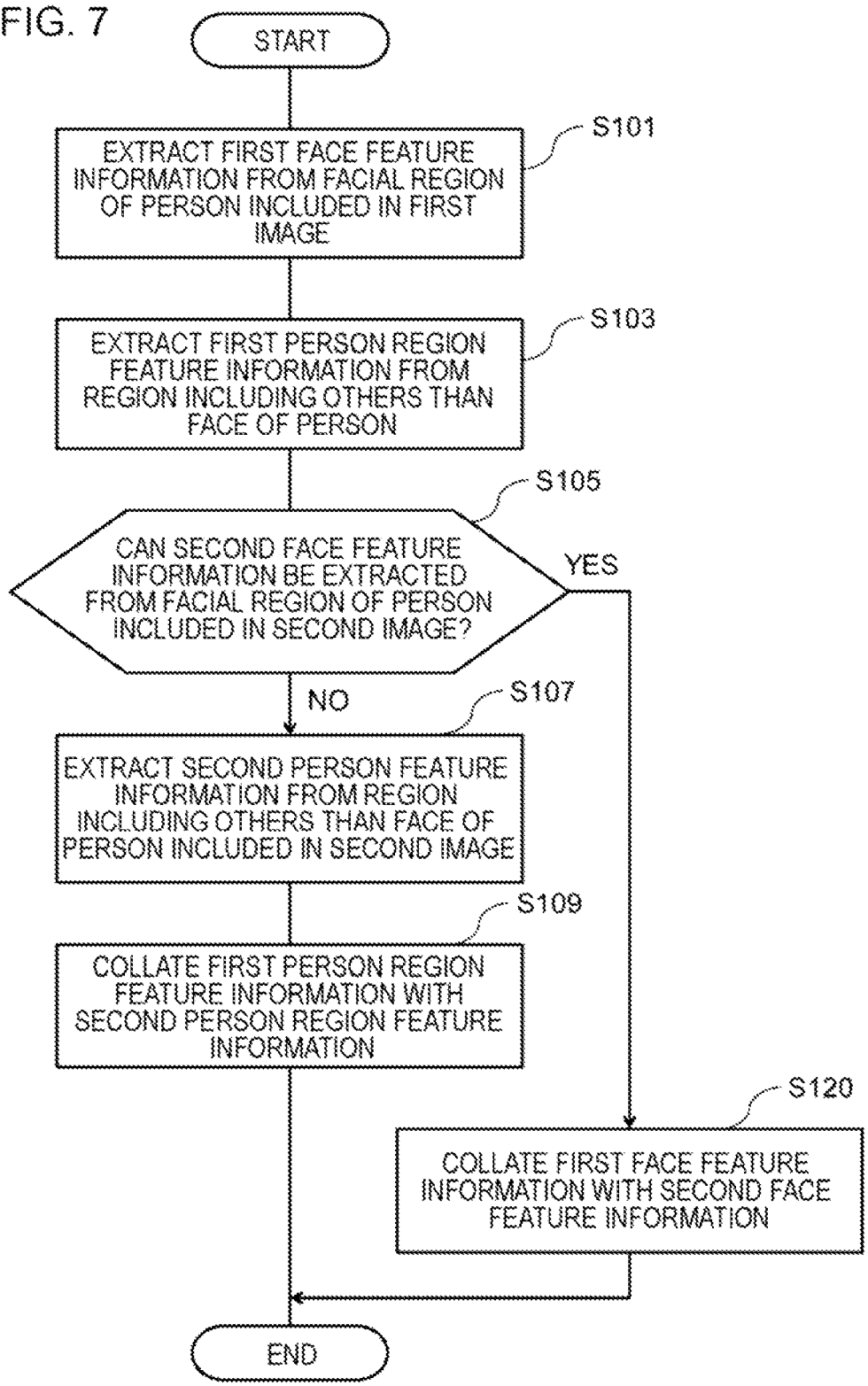
FIG. 7 is a flowchart illustrating an example of an operation of the information processing apparatus.

FIG. 7 is a flowchart illustrating an example of an operation of the information processing apparatus 100 of the present example embodiment. In the present example embodiment, the same steps as step S101 to step S109 in FIG. 4 are provided, and step S120 is further provided.

In the present example embodiment, in a case where the second face feature information has been extracted from the person included in the second image 20 (YES in step S105), the collation unit 104 collates the second face feature information with the first face feature information (step S120). In a case where the second face feature information cannot be extracted from the person included in the second image 20 (NO in step S105), the second person region feature information extracted in step S107 is collated with the first person region feature information extracted in step S103 (step S109).

In the present example embodiment, in a case where all persons included in the first image 10 are set as tracking target persons, collation with face feature information may be performed on a person of which the second face feature information has been extracted among persons included in the second image 20 in step Substrate 105 (YES in step S105), so that the person is tracked. Collation with person region feature information may be performed on a person of which the second face feature information cannot be extracted (NO in step S105), so that the person is tracked. In other words, in a case where a face is captured, tracking can be performed with the face, and, in a case where the face is not captured, tracking can be performed with a costume (person region).

In the present example embodiment, in a case where a face matching the first face information is not found in the second image 20, the information processing apparatus 100 performs a tracking process using person region feature information. In a case where the face is found, the information processing apparatus 100 can continuously track a person with the face of the person instead of performing a tracking process using the person region feature information. As mentioned above, according to the present example embodiment, it is possible to achieve the same as effect as that in the first and second example embodiments, and also to perform a collation process using person region feature information in a case where face authentication cannot be performed since a face is not captured. Thus, efficiency is favorable.

Fourth Example Embodiment

Figure 8:
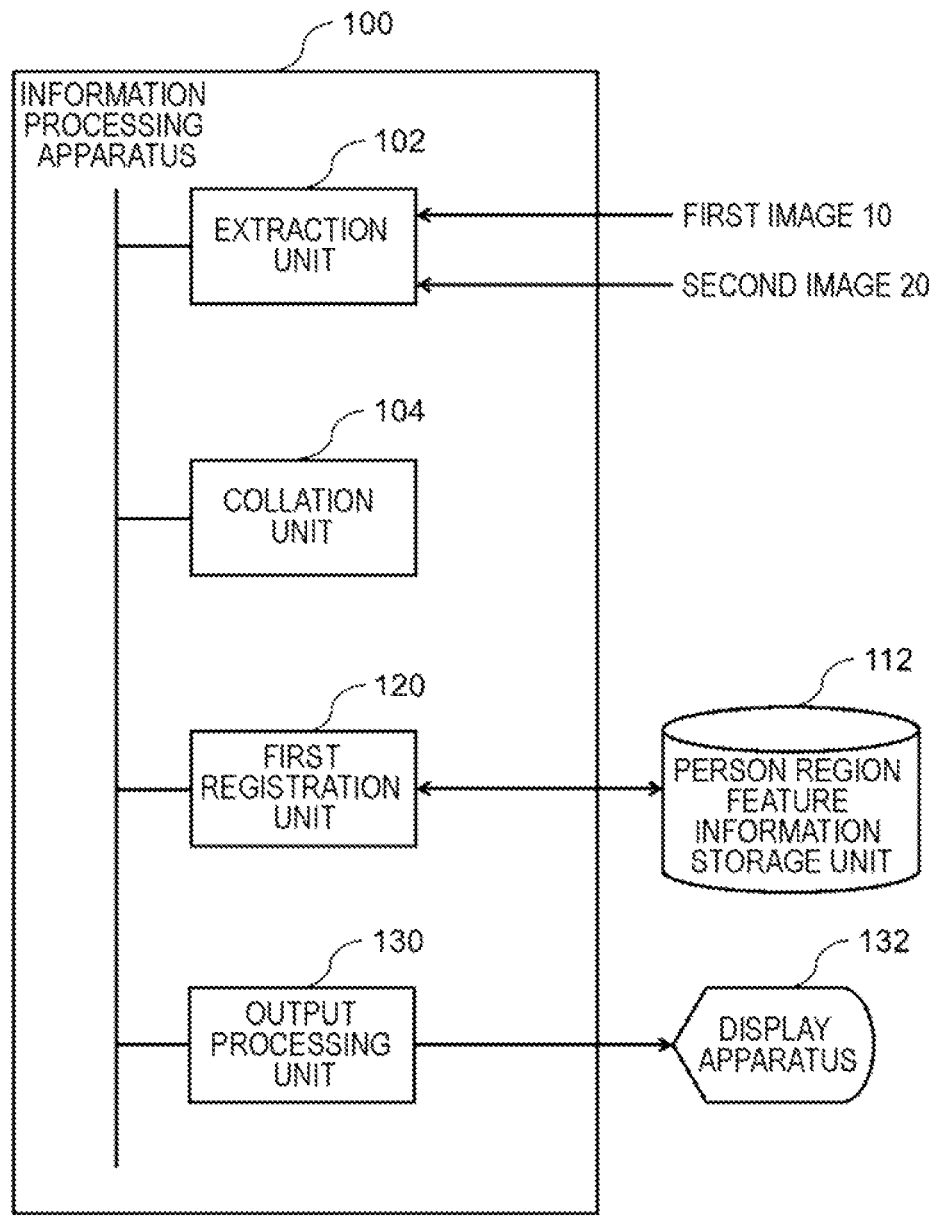
FIG. 8 is a functional block diagram illustrating a logical configuration of the information processing apparatus according to the present example embodiment.

FIG. 8 is a functional block diagram illustrating a logical configuration of the information processing apparatus 100 according to the present example embodiment. The information processing apparatus 100 of the present example embodiment is the same as that of the above-described example embodiment except for a configuration in which an extraction result in the extraction unit 102, person region feature information extracted by the extraction unit 102, person tracking information in the collation unit 104 are output.

The information processing apparatus 100 further includes a first registration unit 120 and an output processing unit 130 in addition to the configuration illustrated in FIG. 2. It should be noted that the information processing apparatus 100 of the present example embodiment may have the same configuration as that of the information processing apparatus 100 of the other example embodiments, and the configurations may be combined with each other within the scope without contradiction. The first registration unit 120 stores the first face feature information and the first person region feature information extracted from a person included in the first image 10, in a person region information storage unit 112 in association with person identification information. In other words, the first registration unit 120 registers the first face feature information and the first person region feature information extracted from the person included in the first image 10, in the person region information storage unit 112 in association with the person identification information. In a case where a collation result in the collation unit 104 indicates a match, the output processing unit 130 the person identification information stored in the person region information storage unit 112 from an output unit. Hereinafter, the first face feature information and the first person region feature information registered in the person region information storage unit 112 will be referred to as registered face feature information and registered person region feature information in some cases.

The output unit is, for example, a display apparatus performing screen display, a printing apparatus performing print-out, and a communication apparatus transmitting a mail. In the present example embodiment, the output processing unit 130 displays various pieces of information on a display apparatus 132 such as a liquid crystal display or an organic electroluminescence (EL) display connected to the information processing apparatus 100.

FIG. 9 is a diagram illustrating an example of a data structure of the person region information storage unit 112.

Figure 9A:
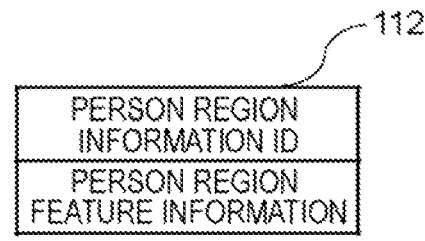
FIG. 9 is a diagram illustrating a variation of a data structure of a person region feature information storage unit.
Figure 9B:
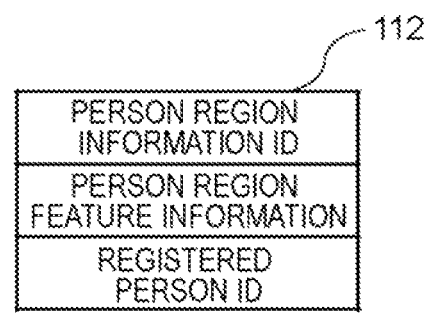
Figure 9C:
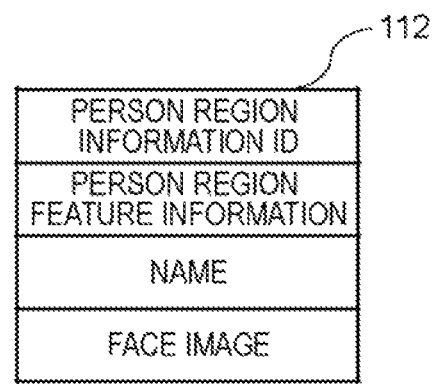

In an example illustrated in FIG. 9A, a person region information ID for identifying person region feature information is associated with person region feature information (corresponding to first person region feature information) extracted by the extraction unit 102 in the person region information storage unit 112, In examples illustrated in FIGS. 9B and 9C, in the second example embodiment, the first person region feature information extracted from a person region other than a facial region of a person of which the first face feature information matching the first face information stored in the face feature information database 110 is extracted is stored in the person region information storage unit 112 as registered person region feature information.

In the example illustrated in FIG. 9B, a person region information ID, the first person region feature information, and a registered person ID of the first face information matching the first face feature information extracted from the first image 10 are correlated with each other. Through association with the registered person ID, the name or a face image of a person corresponding to the registered person ID can be read from the face feature information database 110 in FIG. 6.

In the example illustrated in FIG. 9C, at least one of the name and a face image of a registered person corresponding to the first face information matching the first face feature information extracted from the first image 10 is associated instead of a registered person ID.

In the present example embodiment, the extraction unit 102 acquires the second images 20 from a plurality of cameras 5, and performs an extraction process on the acquired second images 20.

Figure 10A:
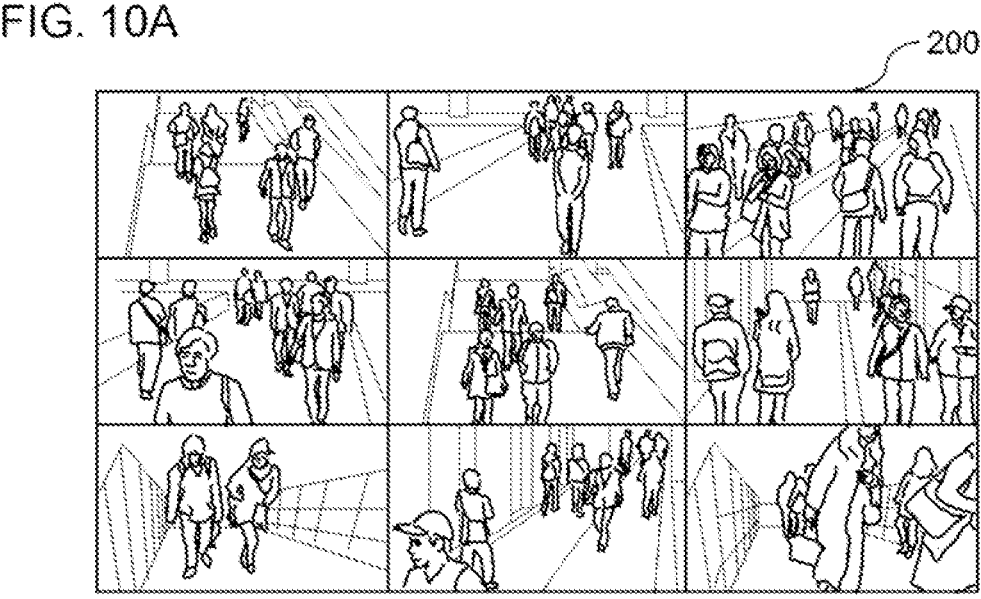
FIG. 10 is a diagram illustrating an example of a screen displayed on a display apparatus by a display processing unit.
Figure 10B:
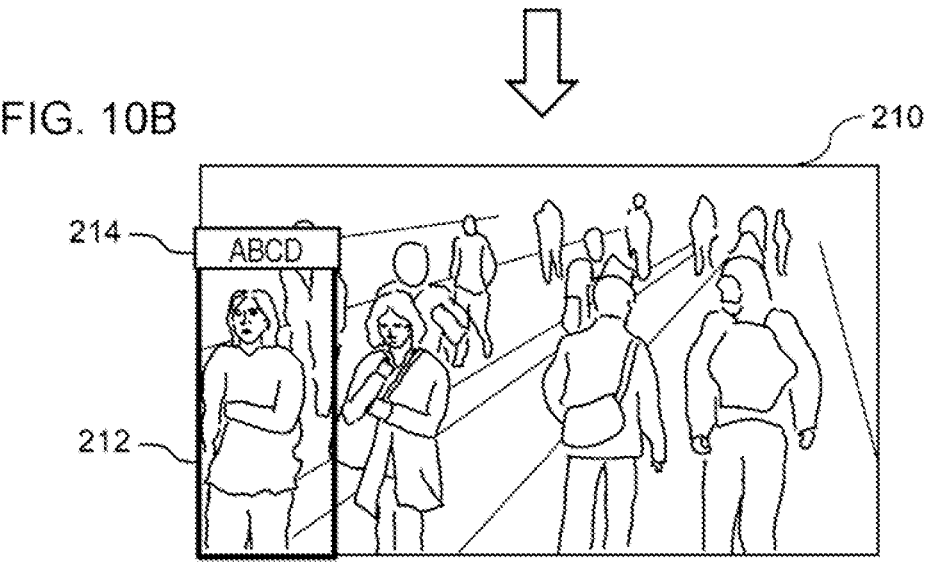

FIG. 10 is a diagram illustrating an example of a screen displayed on the display apparatus 132 by the output processing unit 130. FIG. 10A illustrates a multi-screen 200 in which captured images from a plurality of cameras 5 are displayed to be arranged on a single screen. FIG. 10B illustrates a view screen 210 used to view an operation image from a certain camera 5 in FIG. 10A. In the example of the view screen 210 of FIG. 10B, a person region of a tracking target person extracted by the extraction unit 102 is surrounded by a rectangular frame 212. The name 214 of the person specified by the collation unit 104 is displayed.

The multi-screen 200 and the view screen 210 may be moving images captured in real time by the cameras 5, and may be at least one frame corresponding to a moving image stopped at a certain time point. Also in the multi-screen 200, in the same manner as in the view screen 210, the frame 212 or the name 214 indicating a detected tracking target person may be displayed. The multi-screen 200 and the view screen 210 may be displayed in different windows, and may be displayed in a switching manner. A plurality of view screens 210 may be displayed together.

Information regarding the capturing date and time or information regarding a capturing location of a displayed image may be displayed on the multi-screen 200 and the view screen 210. Alternatively, property information of an image displayed on the multi-screen 200 and the view screen 210 may be displayed in a separate window in response to an operator's operation.

Information regarding the person, for example, a face picture or profile information may be displayed by receiving the operator's operation on the region of the frame 212.

According to the present example embodiment, the output processing unit 130 can display the multi-screen 200 or the view screen 210, and thus it is possible to achieve the same effect as that in the above-described example embodiment and also to recognize a tracking situation in real time.

Fifth Example Embodiment

Figure 11:
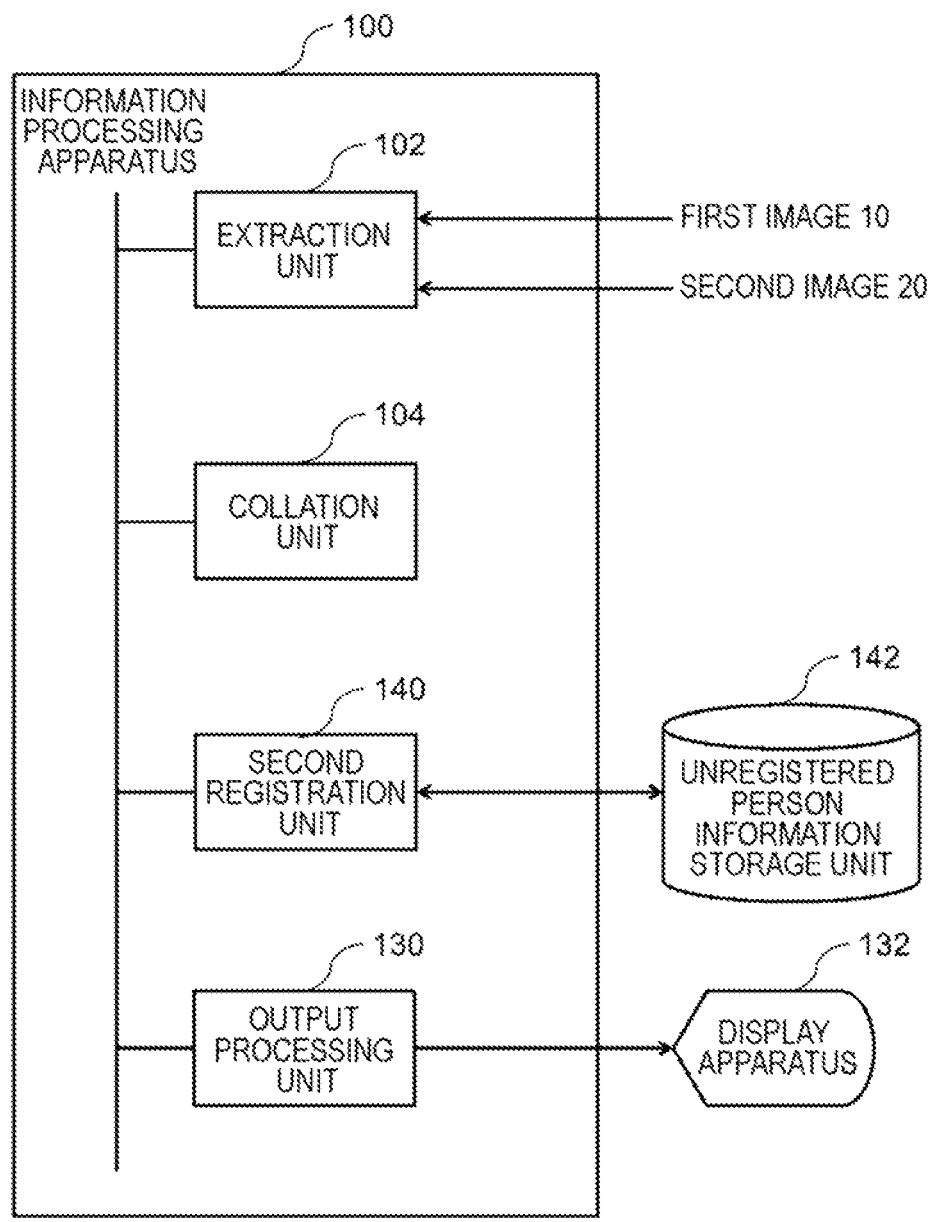
FIG. 11 is a functional block diagram illustrating a logical configuration of the information processing apparatus according to the present example embodiment.

FIG. 11 is a functional block diagram illustrating a logical configuration of the information processing apparatus 100 according to the present example embodiment. The information processing apparatus 100 of the present example embodiment is the same as that of the above-described example embodiment except for a configuration in which information regarding a person not registered in the face feature information database 110 is registered as unregistered person information.

The information processing apparatus 100 further includes a second registration unit 140 in addition to the configuration illustrated in FIG. 2. It should be noted that the information processing apparatus 100 of the present example embodiment may have the same configuration as that of the information processing apparatus 100 of the other example embodiments, and the configurations may be combined with each other within the scope without contradiction. In a case where a collation result between the second face feature information extracted from a facial region of a person included in the second image 20 and the first face information stored in the face feature information database 110 indicates a mismatch, the extraction unit 102 extracts a third person region feature information corresponding to a person region connected to the facial region. The second registration unit 140 stores the extracted third person region feature information and second face feature information in an unregistered person information storage unit 142 in association with each other. In other words, the second registration unit 140 registers the extracted third person region feature information and second face feature information in the unregistered person information storage unit 142 in association with each other. The unregistered person information storage unit 142 may have a database structure.

The unregistered person information storage unit 142 may be included in the same apparatus as that of at least one of the face feature information database 110 and the person region information storage unit 112, and may be included in different apparatuses. The unregistered person information storage unit 142 may be provided integrally with a main body of the information processing apparatus 100 along with the face feature information database 110 and the person region information storage unit 112, and may be provided separately therefrom.

Figure 12:
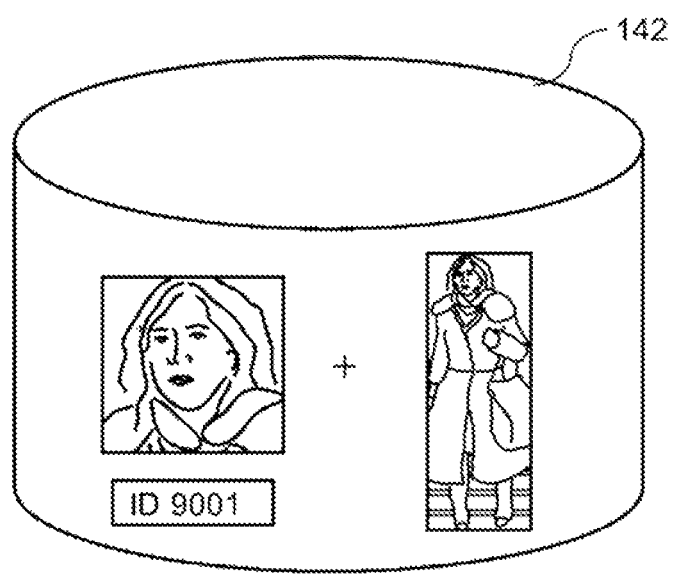
FIG. 12 is a diagram illustrating an example of a data structure of an unregistered person information storage unit.

FIG. 12 is a diagram illustrating an example of a data structure of the unregistered person information storage unit 142. In this example, an unregistered person ID for identifying an unregistered person is the second face feature information extracted from a facial region of a person included in the second image 20 for which a collation result with the first face information indicates a mismatch. The second person region feature information and the third person region feature information are registered in the unregistered person information storage unit 142 in association with the unregistered person ID. At least one of image data of a facial region of a person included in the second image 20 and image data of a person region of the third person region feature information may be registered in the unregistered person information storage unit 142.

Also in the present example embodiment, in the example of the view screen 210 illustrated in FIG. 10B in the above-described example embodiment, with respect to an extracted unregistered person, a person region or a facial region of the person may be surrounded by the rectangular frame 212, and information indicating the unregistered person may be displayed around the frame 212 in an overlapping manner on an image. An unregistered person ID may be displayed. In order to identify the frames 212 of a registered person and an unregistered person from each other, line colors or line types (for example, a solid line and a dashed line) may be changed and displayed separately. The frame 212 is not necessarily required to be used.

Figure 13:
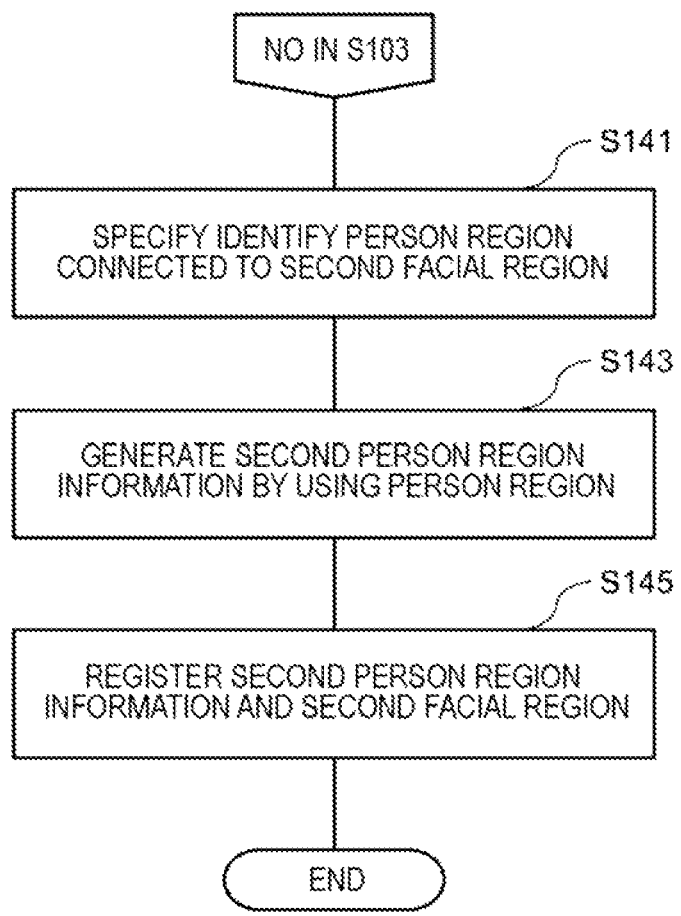
FIG. 13 is a flowchart illustrating an example of an operation of the information processing apparatus.

FIG. 13 is a flowchart illustrating an example of an operation of the information processing apparatus 100 of the present example embodiment. The same process as that in step S103 in FIG. 4 is performed, and, in a case where a facial region cannot be detected (NO in step S103), the flow proceeds to the present process. The second registration unit 140 specifies a person region connected to a second facial region which is judged not to match the first face information extracted by the extraction unit 102 (step S141), and generates second person region feature information corresponding to the person region (step S143). The second registration unit 140 registers the unregistered person information storage unit 142 in association with the generated second person region feature information and the second facial region (step S145).

As described above, in the present example embodiment, a person of which a face cannot be authenticated in the second image 20 can be set as an unregistered person, and a face image and person region feature information thereof can be registered in the unregistered person information storage unit 142. Consequently, for example, in a case where a nonmember enters a facility used by a member registered in advance, information regarding the nonmember can be acquired and registered.

Figure 14:
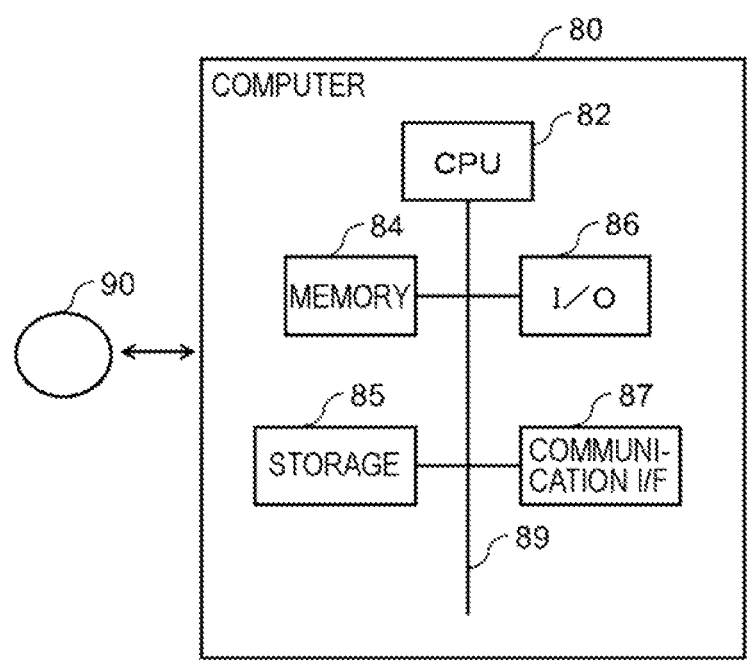
FIG. 14 is a diagram illustrating an example of a computer realizing the information processing apparatus of each example embodiment.

FIG. 14 is a diagram illustrating an example of a configuration of a computer 80 implementing the information processing apparatus 100 of each of the above-described example embodiments.

The computer 80 includes a central processing unit (CPU) 82, a memory 84, a program 90, loaded to the memory 84, for implementing the constituent elements of each information processing apparatus 100 in FIGS. 2, 9, and 11, a storage 85 storing the program 90, an input/output (I/O) 86, and a network connection interface (communication I/F 87).

The CPU 82, the memory 84, the storage 85, the I/O 86, and the communication I/F 87 are connected to each other through a bus 89, and the entire information processing apparatus is controlled by the CPU 82. However, a method of connecting the CPU 82 and the like to each other is not limited to bus connection.

The memory 84 is a memory such as a random access memory (RAM) or a read only memory (ROM). The storage 85 is a storage device such as a hard disk, a solid state drive (SSD), or a memory card.

The storage 85 may be a memory such as a RAM or a ROM. The storage 85 may be provided in the computer 80, may be provided outside the computer 80 as long as the computer 80 can assess the storage, and may be connected to the computer 80 in a wired or wireless manner. Alternatively, the storage may be provided to be attachable to and detachable from the computer 80.

The CPU 82 reads the program 90 stored in the storage 85 to the memory 84 and executes the program, and can thus realize the function of each unit of the information processing apparatus 100 of each example embodiment.

The I/O 86 controls input and output of data and a control signal among the computer 80 and other input and output apparatuses. The other input and output apparatuses include, for example, input apparatuses (not illustrated) such as a keyboard, a touch panel, a mouse, and a microphone connected to the computer 80, output apparatuses such as a display, a printer, and a speaker, and an interface among the computer 80 and the input and output apparatuses. The I/O 86 may control input and output of data with other reading or writing apparatuses (not illustrated) for a storage medium.

The communication I/F 87 is a network connection interface performing communication between the computer 80 and an external apparatus. The communication I/F 87 may be a network interface for connection to a cable line, and may be a network interface for connection to a radio line. For example, the computer 80 implementing the information processing apparatus 100 is connected to at least one camera 5 through a network by using the communication I/F 87.

Each constituent element of the information processing apparatus of each example embodiment is realized by any combination of hardware and software of the computer 80 in FIG. 14. It is understood by a person skilled in the art that there are various modification examples in a realization method and a realization apparatus. The functional block diagram illustrating the information processing apparatus 100 of each of the above-described example embodiments indicates a block in the logical functional unit instead of a configuration in the hardware unit.

The information processing apparatus 100 may be configured with a plurality of computers 80, and may be realized by a virtual server.

As the example of being configuration with a plurality of computers 80, this disclosure may be realized as an information processing system exemplified below, but is not limited thereto.

(1) The extraction unit 102 and the collation unit 104 are realized by different apparatuses (computers 80). For example, the information processing system may include a terminal apparatus having the extraction unit 102 and a server apparatus having the collation unit 104.

(2) Among extraction processes performed by the extraction unit 102, a process of extracting feature information from the first image 10 and a process of extracting feature information from the second image 20 are performed by different apparatuses (computers 80). For example, the information processing system may include a plurality of terminal apparatuses having the extraction unit 102 and analyzing videos, and a server apparatus integrating information therefrom and performing a collation process. The plurality of terminal apparatuses may be disposed to be distributed to respective regions, and the extraction unit 102 may be implemented by a plurality of physical apparatuses.

(3) Feature information which is a target of video analysis (the extraction unit 102 and the collation unit 104) may be distributed to different apparatuses (computers 80) depending on the type (face feature information and person region feature information) thereof.

As mentioned above, the example embodiments of this disclosure have been described with reference to the drawings, but these are examples of this disclosure, and various configurations other than the description may be employed.

For example, in the above-described example embodiment, the extraction unit 102 performs a tracked person retrieval process by using a single piece of person region feature information registered through a person region feature information registration process, but, in another example, the extraction unit 102 may generate a plurality of pieces of first person region feature information on the basis of a plurality of respective first images 10, and may register the pieces of first person region feature information in the person region information storage unit 112 in association with each other.

The collation unit 104 may perform a collation process on at least one piece of registered person region feature information or each of a plurality of pieces of registered person region feature information. Specification regarding information to be used among a plurality of pieces of registered person region feature information may be received from an operator, and specification for using all pieces of registered person region feature information may be received from the operator.

Figure 15:
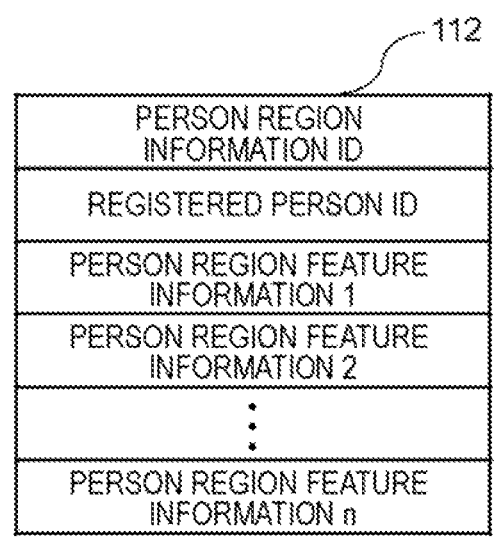
FIG. 15 is a diagram illustrating an example of a data structure of the person region feature information storage unit.

FIG. 15 is a diagram illustrating an example of a data structure of the person region information storage unit 112. In the example illustrated in FIG. 15, a registered person ID and a plurality of pieces of person region feature information n (where n is a natural number) are registered to be associated with a person region information ID.

As described above, the person region feature information is mainly based on a feature such as clothes of a person, and thus tracking is performed on the premise that the person does not change clothes. However, even in a case where the person changes clothes, tracking can be performed by using another piece of person region feature information corresponding to another costume.

The extraction unit 102 may store an image including a person region corresponding to generated first person region feature information in the person region information storage unit 112 in association with first person region feature information. FIG. 16 is a schematic diagram for explaining an example of a data structure of the person region information storage unit 112.

Figure 16A:
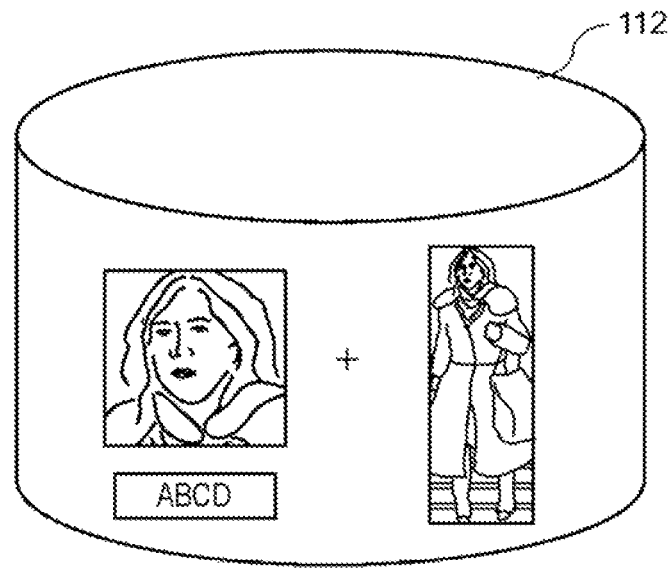
FIG. 16 is a schematic diagram for explaining an example of a data structure of the person region feature information storage unit.
Figure 16B:
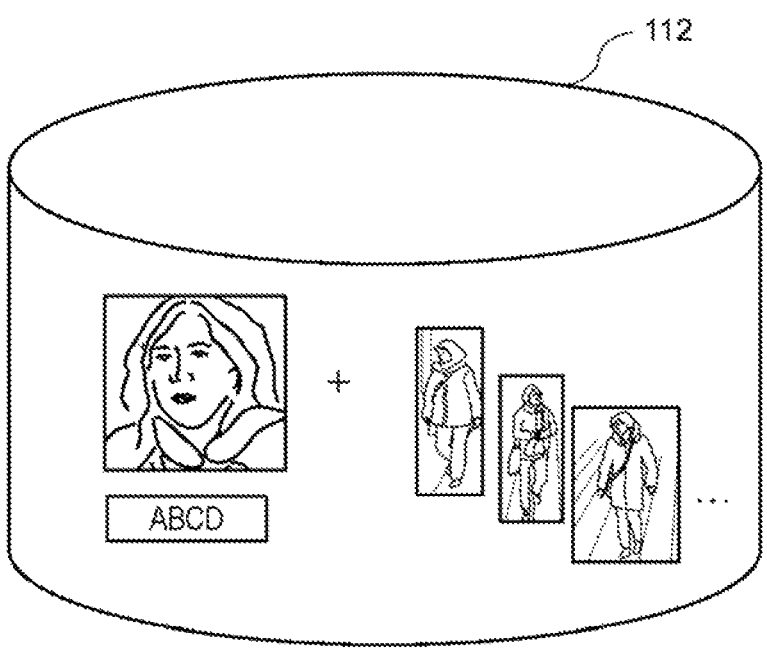

In the example illustrated in FIG. 16A, with respect to a single person, face image data of the person, the name, a single piece of person region feature information (not illustrated), and image data of a person region corresponding to the single piece of person region are registered in the person region information storage unit 112. In the example illustrated in FIG. 16B, with respect to a single person, face image data of the person, the name, a plurality of pieces of person region feature information (not illustrated), and a plurality of pieces of image data of person regions respectively corresponding to the pieces of person region are registered in the person region information storage unit 112.

In the above-described example embodiment, the information processing apparatus 100 more preferentially performs the collation process using face feature information in step S105 in FIG. 5 or 8 than the collation process using person region feature information in step S109 in FIG. 5 or 8, but may preferentially perform either one of the collation process using face feature information and the collation process using person region feature information. A process to be preferentially performed may be changed by receiving an instruction from an operator.

For example, with respect to a person who is highly like to act with the person's face hidden on purpose, the information processing apparatus 100 may first perform a collation process between first person region feature information extracted from a person region of the person included in the first image 10 and second person region feature information extracted from a person region of the person included in the second image 20, and then may perform a collation process using face feature information regardless of a collation result between the person regions. For example, in a situation in which there are many persons wearing similar costumes such as uniforms, the information processing apparatus 100 may first perform face authentication, and may perform a collation process using person region feature information only a person of which a face cannot be authenticated. The information processing apparatus 100 may receive specification regarding a process to be prioritized, and may change a process order on the basis of the specification. In a case where the similarity of person region feature information in the second image 20 exceeds a reference value, the information processing apparatus 100 may automatically change a process order such that a face authentication process is prioritized.

In another example embodiment, when a predetermined event is detected, the information processing apparatus 100 may perform at least one of detection of a facial region, extraction of person region feature information, and person tracking using the person region feature information. The predetermined event may be a predetermined action of a person, that is, an action to be watched, such as deserting, roving, hanging around, swinging an object, or intruding into a predetermined region. The predetermined event may be detected from a captured image generated by a surveillance camera through an image recognition process in the information processing apparatus 100. In this case, the extraction unit 102 may specify a person of which the predetermined event is detected, and may extract facial region feature information and person region feature information with the person as a tracking target person.

As mentioned above, this disclosure has been described with reference to the example embodiments and the Examples, but this disclosure is not limited to the example embodiments and Examples. The configuration or details of this disclosure may be subjected to various changes which can be understood by a person skilled in the art within the scope of this disclosure.

It should be noted that acquisition and use of information regarding a user in this disclosure are assumed to be performed legally.

Some or all of the above-described example embodiments may be disclosed as in the following appendix, but are not limited thereto.

1. An information processing apparatus including:
   an extraction unit that extracts first face feature information from a facial region of a person included in a first image, and extracts first person region feature information from a region including others than a face of the person; and
   a collation unit that collates two or more pieces of feature information with each other,
   in which, in a case where second face feature information is unable to be extracted from a facial region of a person included in a second image, the extraction unit extracts second person region feature information from a region including others than a face of the person included in the second image, and in which the collation unit collates the second person region feature information with the first person region feature information.

2. The information processing apparatus according to 1., in which the second image is generated by an imaging unit which is different from an imaging unit generating the first image.

3. The information processing apparatus according to 1. or 2., in which the second image is an image captured later than the first image.

4. The information processing apparatus according to any one of 1. to 3., in which the collation unit collates the second face feature information with the first face feature information in a case where the second face feature information is able to be extracted from the person included in the second image, and collates the second person region feature information with the first person region feature information in a case where the second face feature information is unable to be extracted from the person included in the second image.

5. The information processing apparatus according to any one of 1. to 4., in which at least one of a process in the extraction unit of extracting the first face feature information, the second face feature information, the first person region feature information, and the second person region feature information and a process in the collation unit of collating the pieces of person region feature information with each other is performed with a detection of a predetermined event as a trigger.

6. The information processing apparatus according to any one of 1. to 5., further including:

a registration unit that stores, as registered person region feature information, the extracted first person region feature information in a storage unit in association with an image including the person region corresponding to the first person region feature information, in which the collation unit collates the second person region feature information with the registered person region feature information stored in the storage.

7. The information processing apparatus according to any one of 1. to 6., further including:

a registration unit that extracts a plurality of pieces of the first person region feature information by using a plurality of the first images, and stores the plurality of pieces of first person region feature information in a storage unit in association with each other as registered person region feature information, in which the collation unit collates the second person region feature information with at least one of the pieces of registered person region feature information stored in the storage unit.

8. The information processing apparatus according to any one of 1. to 7., in which the collation unit collates the first face feature information extracted from the facial region of the person included in the first image with first face information stored in a storage unit, and extracts the first person region feature information from the person included in the first image in a case where a collation result indicates a match.

9. The information processing apparatus according to 8., in which the extraction unit extracts third person region feature information from a person region including others than the facial region of the person in a case where a collation result between the first face feature information extracted from the facial region of the person included in the first image and the first face information stored in the storage unit indicates a mismatch, and in which the information processing apparatus further includes a registration unit that stores the extracted third person region feature information and the first face feature information in a second storage unit in association with each other.

10. The information processing apparatus according to 9., in which the registration unit stores an image of the facial region from which the first face feature information is extracted in the second storage unit in association with the first face feature information and the third person region feature information.

11. The information processing apparatus according to any one of 1. to 10., further including:

a registration unit that stores the first face feature information extracted from the person included in the first image and the first person region feature information in a storage unit in association with identification information of the person; and an output processing unit that causes an output unit to output the identification information of the person stored in the storage unit in a case where a collation result in the collation unit indicates a match.

12. The information processing apparatus according to any one of 1. to 11., in which the information processing apparatus is connected to a plurality of imaging units through a network, and in which the extraction unit acquires the second image from the plurality of imaging units, and performs an extraction process on the acquired second image.

13. An information processing system including:

an extraction unit that extracts first face feature information from a facial region of a person included in a first image, and extracts first person region feature information from a region including others than a face of the person; and a collation unit that collates two or more pieces of feature information with each other, in which, in a case where second face feature information is unable to be extracted from a facial region of a person included in a second image, the extraction unit extracts second person region feature information from a region including others than a face of the person included in the second image, and in which the collation unit collates the second person region feature information with the first person region feature information.

14. The information processing system according to 13., in which the second image is generated by an imaging unit which is different from an imaging unit generating the first image.

15. The information processing system according to 13. or 14., in which the second image is an image captured later than the first image.

16. The information processing system according to any one of 13. to 15., in which the collation unit collates the second face feature information with the first face feature information in a case where the second face feature information is able to be extracted from the person included in the second image, and collates the second person region feature information with the first person region feature information in a case where the second face feature information is unable to be extracted from the person included in the second image.

17. The information processing system according to any one of 13. to 16.,
in which at least one of a process in the extraction unit of extracting the first face feature information, the second face feature information, the first person region feature information, and the second person region feature information and a process in the collation unit of collating the pieces of person region feature information with each other is performed with a detection of a predetermined event as a trigger.

18. The information processing system according to any one of 13. to 17., further including:
a registration unit that stores, as registered person region feature information, the extracted first person region feature information in a storage unit in association with an image including the person region corresponding to the first person region feature information,
in which the collation unit collates the registered person region feature information stored in the storage unit with the second person region feature information.

19. The information processing system according to any one of 13. to 18., further including:
a registration unit that extracts a plurality of pieces of the first person region feature information by using a plurality of the first images, and stores the plurality of pieces of first person region feature information in a storage unit in association with each other as registered person region feature information,
in which the collation unit collates the second person region feature information with at least one of the pieces of registered person region feature information stored in the storage unit.

20. The information processing system according to any one of 13. to 19.,
in which the collation unit collates the first face feature information extracted from the facial region of the person included in the first image with first face information stored in a storage unit, and extracts the first person region feature information from the person included in the first image in a case where a collation result indicates a match.

21. The information processing system according to 20.,
in which the extraction unit extracts third person region feature information from a person region including others than the facial region of the person in a case where a collation result between the first face feature information extracted from the facial region of the person included in the first image and the first face information stored in the storage unit indicates a mismatch, and
in which the information processing system further includes a registration unit that stores the extracted third person region feature information and the first face feature information in a second storage unit in association with each other.

22. The information processing system according to 21.,
in which the registration unit stores an image of the facial region from which the first face feature information is extracted in the second storage unit in association with the first face feature information and the third person region feature information.

23. The information processing system according to any one of 13. to 22., further including:
a registration unit that stores the first face feature information extracted from the person included in the first image and the first person region feature information in a storage unit in association with identification information of the person; and
an output processing unit that causes an output unit to output the identification information of the person stored in the storage unit in a case where a collation result in the collation unit indicates a match.

24. The information processing system according to any one of 13. to 23.,
in which the information processing apparatus is connected to a plurality of imaging units through a network, and
in which the extraction unit acquires the second image from the plurality of imaging units, and performs an extraction process on the acquired second image.

25. An information processing method executed by an information processing apparatus, the method comprising:
extracting first face feature information from a facial region of a person included in a first image, and extracts first person region feature information from a region including others than a face of the person;
collating two or more pieces of feature information with each other;
extracting, in a case where second face feature information is unable to be extracted from a facial region of a person included in a second image, second person region feature information from a region including others than a face of the person included in the second image; and
collating the second person region feature information with the first person region feature information.

26. The information processing method according to 25.,
in which the second image is generated by an imaging unit which is different from an imaging unit generating the first image.

27. The information processing method according to 25. or 26.,
in which the second image is an image captured later than the first image.

28. The information processing method executed by the information processing apparatus according to any one of 25. to 27., the method comprising:
collating the second face feature information with first the face feature information in a case where the second face feature information is able to be extracted from the person included in the second image, and collating the second person region feature information with the first person region feature information in a case where the second face feature information is unable to be extracted from the person included in the second image.

29. The information processing method executed by the information processing apparatus according to any one of 25. to 28., the method comprising:
performing at least one of a process of extracting the first face feature information, the second face feature information, the first person region feature information, and the second person region feature information and a process of collating the pieces of person region feature information with each other with a detection of a predetermined event as a trigger.

30. The information processing method executed by the information processing apparatus according to any one of 25. to 29., the method further including:
storing, as registered person region feature information, the extracted first person region feature information in a storage unit in association with an image including the person region corresponding to the first person region feature information,
collating the second person region feature information with the registered person region feature information stored in the storage unit.

31. The information processing method executed by the information processing apparatus according to any one of 25. to 30., the method further including:
causing the information processing apparatus to extract a plurality of pieces of the first person region feature information by using a plurality of the first images, and stores the plurality of pieces of first person region feature information in a storage unit in association with each other as registered person region feature information; and
collating the second person region feature information with at least one of the pieces of registered person region feature information stored in the storage unit.

32. The information processing method executed by the information processing apparatus according to any one of 25. to 31., the comprising:
collating the first face feature information extracted from the facial region of the person included in the first image with first face information stored in a storage unit, and extracting the first person region feature information from the person included in the first image in a case where a collation result indicates a match.

33. The information processing method executed by the information processing apparatus according to 32., the method comprising:
extracting third person region feature information from a person region including others than the facial region of the person in a case where a collation result between the first face feature information extracted from the facial region of the person included in the first image and the first face information stored in the storage unit indicates a mismatch; and
storing the extracted third person region feature information and the first face feature information in a second storage unit in association with each other.

34. The information processing method executed by the information processing apparatus according to 33., the method comprising:
storing an image of the facial region from which the first face feature information is extracted in the second storage unit in association with the first face feature information and the third person region feature information.

35. The information processing method executed by the information processing apparatus according to any one of 25. to 34., the method further including:
storing the first face feature information extracted from the person included in the first image and the first person region feature information in a storage unit in association with identification information of the person; and
outputting the identification information of the person stored in the storage unit from an output unit in a case where a collation result indicates a match.

36. The information processing method according to any one of 25. to 35.,
in which the information processing apparatus is connected to a plurality of imaging units through a network, and
in which the method executed by the information processing apparatus comprising:
acquiring the second image from the plurality of imaging units, and performs an extraction process on the acquired second image.

37. A program causing a computer to execute:
a procedure of extracting first face feature information from a facial region of a person included in a first image, and extracts first person region feature information from a region including others than a face of the person;
a procedure of collating two or more pieces of feature information with each other;
a procedure of extracting, in a case where second face feature information is unable to be extracted from a facial region of a person included in a second image, second person region feature information from a region including others than a face of the person included in the second image; and
a procedure of collating the second person region feature information with the first person region feature information.

38. The program according to 37.,
in which the second image is generated by a camera which is different from a camera generating the first image.

39. The program according to 37. or 38.,
in which the second image is an image captured later than the first image.

40. The program according to any one of 37. to 39., causing the computer to execute:
a procedure of collating the second face feature information with the first face feature information in a case where the second face feature information is able to be extracted from the person included in the second image, and collating the second person region feature information with the first person region feature information in a case where the second face feature information is unable to be extracted from the person included in the second image.

41. The program according to any one of 37. to 40., causing the computer to execute:
a procedure of performing at least one of a process of extracting the first face feature information, the second face feature information, the first person region feature information, and the second person region feature information and a process of collating the pieces of person region feature information with each other with a detection of a predetermined event as a trigger.

42. The program according to any one of 37. to 41., causing the computer to execute:
a procedure of storing, as registered person region feature information, the extracted first person region feature information in a storage unit in association with an image including the person region corresponding to the first person region feature information, and
a procedure of collating the registered person region feature information stored in the storage unit with the second person region feature information.

43. The program according to any one of 37. to 42., causing the computer to execute:
a procedure of extracting a plurality of pieces of the first person region feature information by using a plurality of the first images, and stores the plurality of pieces of first person region feature information in a storage unit in association with each other as registered person region feature information, and a procedure of collating the second person region feature information with at least one of the pieces of registered person region feature information stored in the storage unit.

44. The program according to any one of 37. to 43., causing the computer to execute:

a procedure of collating the first face feature information extracted from the facial region of the person included in the first image with first face information stored in a storage unit, and extracting the first person region feature information from the person included in the first image in a case where a collation result indicates a match.

45. The program according to 44., causing the computer to execute:

a procedure of extracting third person region feature information from a person region including others than the facial region of the person in a case where a collation result between the first face feature information extracted from the facial region of the person included in the first image and the first face information stored in the storage unit indicates a mismatch, and a procedure of storing the extracted third person region feature information and the first face feature information in a second storage unit in association with each other.

46. The program according to 45., causing the computer to execute:

a procedure of storing an image of the facial region from which the first face feature information is extracted in the second storage unit in association with the first face feature information and the third person region feature information.

47. The program according to any one of 37. to 46., causing the computer to execute:

a procedure of storing the first face feature information extracted from the person included in the first image and the first person region feature information in a storage unit in association with identification information of the person, and a procedure of outputting the identification information of the person stored in the storage unit from an output unit in a case where a collation result indicates a match.

48. The program according to any one of 37. to 47., in which the computer is connected to a plurality of imaging units through a network, and in which the computer executes a procedure of acquiring the second image from the plurality of imaging units, and performing an extraction process on the acquired second image.

What is claimed is:

1. An information processing apparatus which is connected to a plurality of cameras through a network, comprising:

at least one memory configured to store instructions; and
at least one processor configured to execute the instructions to:

perform an extraction process to extract first face feature information from a first facial region of a first person included in a first image, and extract first person region feature information from a first person region other than the first facial region of the first person; respectively acquire a plurality of second images from the plurality of cameras;

for each second image, perform the extraction process to extract second face feature information from a second facial region of a second person included in the second image, wherein the extraction process is successful or unsuccessful;

for each second image in which the extraction process was unsuccessful in extracting the second face feature information, perform the extraction process to extract second person region feature information from a second person region other than the second facial region in the second image;

in case where the extraction process was performed to extract the second person region information, perform a first collation process to collate the second person region feature information for each second image for which the extraction process was performed to extract the second person region information with the first person region feature information to obtain a first collation result and to continuously track in each of the plurality of second images the second person to the first person;

perform a second collation process to collate the second face feature information with registered face feature information stored as information on a registered specific person in a first storage to acquire a second collation result;

for each second image in which the extraction process was successful in extracting the second face feature information and for which the second face information does not match the registered face feature information, perform the extraction process to extract third person region feature information from a third person region other than the second facial region in the second image; and store, as information on an unregistered person, the extracted third person region feature information and the second face feature information in a second storage in association with each other.

2. The information processing apparatus according to claim 1, wherein the plurality of cameras that capture the plurality of second images are different from a camera that captures the first image.

3. The information processing apparatus according to claim 1, wherein each of the plurality of second images is captured later than when the first image is captured.

4. The information processing apparatus according to claim 1, wherein the at least one processor is further configured to execute the instructions to:

perform another second collation process to collate the second face feature information for each second image for which the extraction process was successfully performed to extract the second person region information with the first face feature information.

5. The information processing apparatus according to claim 1, wherein at least one of the extraction process of is performed to extract at least one of the first face feature information, the second face feature information, the first person region feature information, and the second person region feature information and the first collation process is performed responsive to detection of a predetermined event, the predetermined event is a predetermined action of the second person, the predetermined action being an action to be watched and is detected from the plurality of second images through an image recognition process, and the action to be watched includes at least one of deserting, roving, hanging around, swinging an object, and intruding into a predetermined region.

6. The information processing apparatus according to claim 1, wherein the at least one processor is further configured to execute the instructions to:
  perform the extraction process to extract a plurality of pieces of the first person region feature information by using a plurality of the first images;
  store the plurality of pieces of the first person region feature information in a third storage in association with each other as pieces of tracking target person region feature information; and
  perform the first collation process to collate the second person region feature information with at least one of the pieces of the tracking target person region feature information stored in the third storage.

7. The information processing apparatus according to claim 1,
  wherein the at least one processor is further configured to execute the instructions to:
  for each second image in which the extraction process was successful in extracting the second face feature information and for which the second face information matches the first face feature information, perform the extraction process to extract the second person region feature information from the second person region in the second image.

8. The information processing apparatus according to claim 1, wherein the at least one processor is further configured to execute the instructions to
  store the first image including the first facial region from which the first face feature information has been extracted in the second storage in association with the first face feature information and the third person region feature information.

9. The information processing apparatus according to claim 1, wherein the at least one processor is further configured to execute the instructions to:
  store the first face feature information and the first person region feature information in a third storage in association with identification information of the first person; and
  cause output of the identification information of the first person stored in the storage in a case where the first collation result indicates a match.

10. An information processing method comprising:
  performing, by a processor, an extraction process to extract first face feature information from a first facial region of a first person included in a first image, and extract first person region feature information from a first person region other than the first facial region of the first person;
  respectively acquiring, by the processor, a plurality of second images from a plurality of cameras;
  for each second image, performing, by the processor, the extraction process to extract second face feature information from a second facial region of a second person included in the second image, wherein the extraction process is successful or unsuccessful;
  for each second image in which the extraction process was unsuccessful in extracting the second face feature information, performing, by the processor, the extraction process to extract second person region feature information from a second person region other than the second facial region in the second image;
  in a case where the extraction process was performed to extract the second person region feature information, performing, by the processor, a first collation process to collate the second person region feature information for each second image for which the extraction process was performed to extract the second person region information with the first person region feature information to obtain a first collation result and to continuously track in each of the plurality of second images the second person to the first person;
  performing, by the processor, a second collation process to collate the second face feature information with registered face feature information stored as information on a registered specific person in a first storage to acquire a second collation result;
  for each second image in which the extraction process was successful in extracting the second face feature information and for which the second face information does not match the registered face feature information, performing, by the processor, the extraction process to extract third person region feature information from a third person region other than the second facial region in the second image; and
  storing, by the processor and as information on an unregistered person, the extracted third person region feature information and the second face feature information in a second storage in association with each other.

11. The information processing method according to claim 10,
  wherein the plurality of cameras that capture the plurality of second images are different from a camera that captures the first image.

12. The information processing method according to claim 10,
  wherein each of the plurality of second images is captured later than when the first image is captured.

13. The information processing method according claim 10, further comprising:
  performing, by the processor, another second collation process to collate the second face feature information for each second image for which the extraction process was successfully performed to extract the second person region information with the first face feature information.

14. The information processing method according claim 10,
  wherein at least one of the extraction process of is performed to extract at least one of the first face feature information, the second face feature information, the first person region feature information, and the second person region feature information and the first collation process is performed responsive to detection of a predetermined event,
  the predetermined event is a predetermined action of the second person, the predetermined action being an action to be watched and is detected from the plurality of second images through an image recognition process, and
  the action to be watched includes at least one of deserting, roving, hanging around, swinging an object, and intruding into a predetermined region.

15. The information processing method according claim 10, further comprising:
- storing, by the processor and as tracking target person feature information, the first person region feature information in a third storage in association with the first image; and
- performing, by the processor, the first collation process to collate the second person region feature information with the tracking target person region feature information stored in the third storage.

16. The information processing method according claim 10, further comprising:
- performing, by the processor, the extraction process to extract a plurality of pieces of the first person region feature information by using a plurality of the first images, and storing the plurality of pieces of first person region feature information in a third storage in association with each other as pieces of tracking target person region feature information; and
- performing, by the processor, the first collation process to collate the second person region feature information with at least one of the pieces of the tracking target person region feature information stored in the third storage.

17. A non-transitory computer readable medium storing a program executable by a computer to cause the computer to execute:
- performing an extraction process to extract first face feature information from a first facial region of a first person included in a first image, and extract first person region feature information from a first person region other than the first facial region of the first person;
- respectively acquiring a plurality of second images from a plurality of cameras;
- for each second image, performing the extraction process to extract second face feature information from a second facial region of a second person included in the second image, wherein the extraction process is successful or unsuccessful;
- for each second image in which the extraction process was unsuccessful in extracting the second face feature information, performing the extraction process to extract second person region feature information from a second person region other than the second facial region in the second image;
- in a case where the extraction process was performed to extract the second person region feature information, performing a first collation process to collate the second person region feature information for each second image for which the extraction process was performed to extract the second person region information with the first person region feature information to obtain a first collation result and to continuously track in each of the plurality of second images the second person to the first person;
- perform a second collation process to collate the second face feature information with registered face feature information stored as information on a registered specific person in a first storage to acquire a second collation result;
- for each second image in which the extraction process was successful in extracting the second face feature information and for which the second face information does not match the registered face feature information, perform the extraction process to extract third person region feature information from a third person region other than the second facial region in the second image; and
- store, as information on an unregistered person, the extracted third person region feature information and the second face feature information in a second storage in association with each other.

18. The information processing apparatus according to claim 1,
- wherein the at least one processor is further configured to execute the instructions to:
  - store, as tracking target person region feature information, the first person region feature information in a third storage in association with the first image; and
  - perform the first collation process to collate the second person region feature information with the tracking target person region feature information stored in the third storage.

* * * * *